United States Patent [19]

Andrews

[11] Patent Number: 4,703,615
[45] Date of Patent: Nov. 3, 1987

[54] MULTI-PURPOSE TRIM AND YARD RECEPTACLE

[76] Inventor: Robert C. Andrews, 1106 Ellicott Rd., Lewiston, N.Y. 14092

[21] Appl. No.: 801,078

[22] Filed: Nov. 22, 1985

[51] Int. Cl.⁴ .......................................... A01D 46/22
[52] U.S. Cl. ................................... 56/329; 150/52 R
[58] Field of Search .................. 56/1, 329; 150/52 R; 15/238, 257.1, 257.6

[56] References Cited

U.S. PATENT DOCUMENTS

| | | | |
|---|---|---|---|
| 872,764 | 12/1907 | Smith | 56/329 |
| 2,749,695 | 6/1956 | Hoopingarner | 56/1 |
| 2,766,797 | 10/1956 | Cowen | 150/52 R |
| 2,911,025 | 11/1959 | Paros | 150/52 R |
| 3,722,023 | 3/1973 | Gray | 15/257.1 |
| 4,058,956 | 11/1977 | Skonieczny | 56/1 |
| 4,200,127 | 4/1980 | Dunleavy | 56/1 |
| 4,539,800 | 9/1985 | Furmaga | 56/329 |
| 4,561,480 | 12/1985 | Underwood et al. | 15/257.1 |

FOREIGN PATENT DOCUMENTS 235969  6/1911  Fed. Rep. of Germany ..... 15/257.6

Primary Examiner—Stephen J. Novosad
Assistant Examiner—William P. Neuder
Attorney, Agent, or Firm—Donald C. Studley

[57] ABSTRACT

The present invention relates to a portable multi-use receptacle. The device is particularly useful as a receptacle for collecting and holding tree and shrub trimmings or leaves. The device consists of a basin-like structure having a flat rigid base. The base has an outer wall attached to the periphery thereof. The outer base has an opening therein between about ⅛ and about ⅓ of the periphery. The base has a second substantially shorter wall bridging the opening of the first wall along the periphery of the base. The base has a third wall corresponding approximately in height to the second wall. The third wall extends inward from one juncture of the first and second walls to the center portion of the base and then outward to the other juncture of the first and second walls. In this manner a walled, wedge-shaped section is defined in the base. The wedge-shaped area is removeable to obtain a walled substantially wedge-shaped opening in the base that is of a size to receive the trunk of a tree or shrub that is to be trimmed.

14 Claims, 3 Drawing Figures

MULTI-PURPOSE TRIM AND YARD RECEPTACLE

BACKGROUND OF THE INVENTION

The present invention relates to a portable multi-purpose trim and yard receptacle. The present receptacle is particularly adapted and eminently useful to receive vegetation clippings and as an aid in handling, transporting and disposing of such clippings. The present device is also equally adapted and well suited to numerous other uses around the household. For example, the device is useful as a receiver and collector of leaves, or grass clippings, as a holder for paint cans and painting equipment during indoor or outdoor household painting, as a background for the spray painting of small items, as a drip catcher, as a container for the storage of household water hose, as a cloche, or as a base for a Christmas tree. Although the present device has a multiplicity of uses, it's primary functions and uses are to catch and collect clippings, or trimmings, from trees and shrubs as they are being trimmed, for the collection of leaves and grass clippings as they are removed from the ground, and as an aid in the transportation and disposal of such clippings and leaves.

Landscape architecture is defined as the modification of land and vegetation for increased pleasure or usefulness. However, to the average householder such modification involves the tedious task of trimming and shaping trees and bushes, particularly evergreens, to maintain a pleasing line or a desired shape. Further, this task must be repeated numerous times during the growing year in order to maintain such pleasing appearance. Added to this task is the equally tedious task of collecting and removing the trimmings and clippings from the area surrounding the tree or shrub after the trimming operation has been completed. In the Fall of the year the broadleaf trees shed their folage and the householder is faced with gathering, transporting and disposing of the fallen leaves.

The present invention provides a portable, receptacle that is easily placed in position beneath the tree or shrub to receive and collect tree trimmings. The present receptacle is equally useful in the Fall of the year to receive a large quantity of leaves and to provide a means of transporting the leaves to a disposal location.

When placed in position beneath a tree or shrub the present device may also provide a guide, or reference plane, to aid the trimmer in shaping the tree or bush. The positioned receptacle, or from marks in the bottom of the receptacle are useful as a guide to the trimmer in determining the amount of vegetation to be cut or trimmed from a specific tree or shrub. The present receptacle, or dish, will hereinafter be described as being round, as such shape is highly versatile and is adapted to use as a guide and aid in rounding trees and shrubs. However, it will be understood that the present receptacle may be made in a square, rectangular, multisided or other configurations.

Previously a number of collectors or collars have been proposed for use around trees and shrubs. Among thse are U.S. Pat. Nos. 2,436,173 which relates to a fruit getherer; U.S. Pat. No. 2,868,255 which relates to a floor cover for use under Christmas trees; U.S. Pat. No. 3,305,969 which relates to a protective collar for trees, and; U.S. Pat. No. 4,058,956 which relates to a vegetation clipping collector in the form of a roll out mat. None of the prior art collectors or collars are pertinent to the present invention and none suggest the receptacle structure as described and claimed below.

BRIEF DESCRIPTION OF THE INVENTION

The present invention relates to a multi-use, portable receptacle. The device is particularly useful as a receptacle for collecting and holding tree and shrub trimmings or leaves, and as an aid in the transportation and subsequent disposal of such trimmings or leaves. In a preferred embodiment, the device is useful as an aid in the topiary art in that the receptacle may be quickly and easily positioned around a tree or shrub and may be used as a guide in the trimming operation. The device is highly useful to receive and hold material, such as, leaves, or grass clippings, as they are removed from the ground, to transport the collected materials to a disposal location, and as an aid in bagging such collected materials. Other uses include, but are not limited to, use as a painting aid, as a drip catcher, to store garden hose in the winter, as a temporary cover to protect plants from cold in the Spring or Fall, as a base for a Christmas tree.

The present device consists of a basin-like structure having a flat, or substantially flat, rigid, base. The base has a first upstanding outer wall attached to the periphery thereof. The outer wall has an opening therein of between about $\frac{1}{8}$ and about $\frac{1}{3}$ of the periphery. The base has a second, substantially shorter outer wall attached to the periphery thereof bridging the opening in the first outer wall. The base has a third wall corresponding approximately in height to the second wall. The third wall extends inward from one juncture of the first and second walls to the center portion of the base and then outward to the other juncture of the first and second walls. A walled, substantially triangular, or wedge-shaped section is defined on the base. The defined, substantially wedge-shaped, area is removeable, suitably by cutting or sawing through the base to obtain a walled, substantially wedged-shaped opening in the base. Suitably the base is scored along the inner periphery of the inner wall to facilitate ease of removal.

In a preferred embodiment, the wedge-shaped portion is removed, leaving the base with the original first outer wall and a substantially shorter inner wall extending from one juncture of the inner and outer walls inward to the center portion of the base and outward to the other juncture of the inner and outer walls, defining a walled substantially wedge-shaped, opening. The opening is adapted to receive, and allow the device to be positioned around, the trunk of a tree or shrub. In a particularly preferred embodiment the opening may be adjusted to be partly opened or closed allowing the device to be centered under wider or thinner trees or shrubs. Suitably the device has one or more handles positioned around the outer wall to enable easy movement around the tree or shrub being trimmed and to aid in removing or transporting the device after the device has been filled with trimmings or leaves. In a further preferred embodiment the first wall is extendable upward, suitably by having means thereon, or therein, to receive and hold posts, or rods, which may be used to support an upward extention of the sides of the device, such as, a solid secondary wall, a mesh or a fabric. Such embodiment is particularly useful when the device is used to collect and transport leaves or grass clippings.

DETAILED DESCRIPTION OF THE INVENTION

The invention will now be described by reference to the accompanying drawings which form part of the present specification and wherein like numerals refer to like parts in each of the views.

Figure 1:
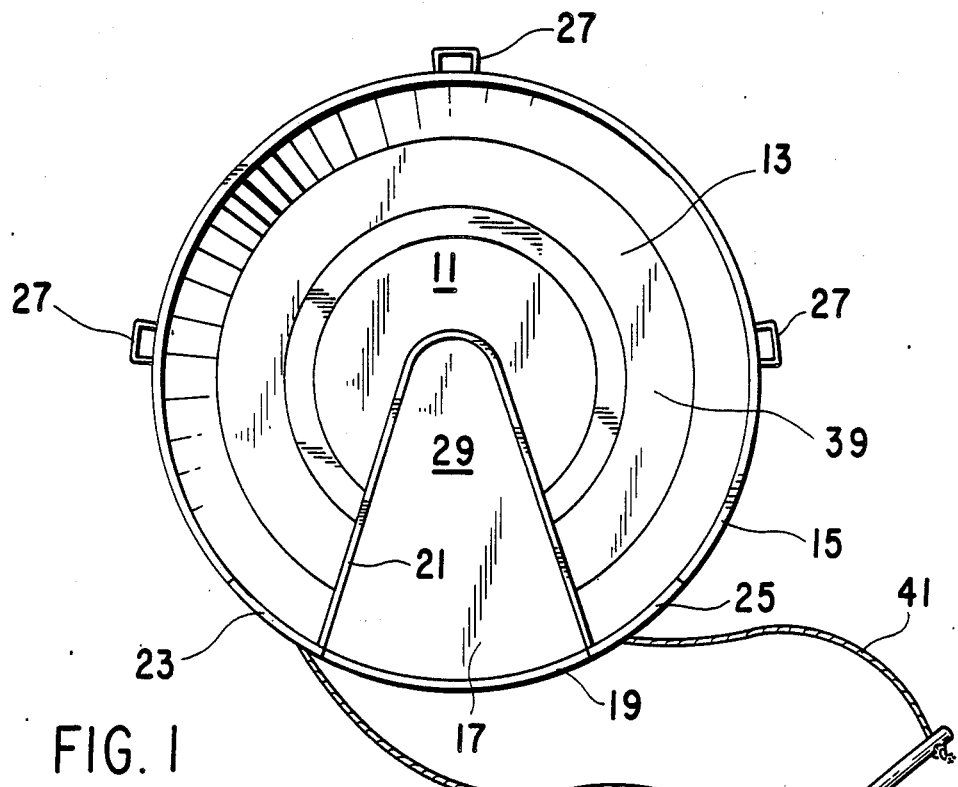
FIG. 1 is a top plan view of a first embodiment of the present multi-use receptacle, or dish.

Looking now at the drawings, the present receptacle is generally denoted as 11. Receptacle 11 is a basin-like structure. Receptacle 11 has a flat, or substantially flat, rigid base 13. Base 13 has an outer upstanding wall 15 extending, except for wall opening 17, around the periphery of the base. The periphery of base 13 along opening 17 has a second wall 19 substantially shorter than wall 15. Base 13 further has an inner wall 21 extending from one juncture of walls 15 and 19 into the center portion of base 13 and outward to the other juncture of walls 15 and 19, defining wedge-shaped area 29. Wall 21 is substantially the same height as wall 19. The height of outer wall 15 may be varied in accord with the use of the device, however, a height between about 6 inches and about 15 inches is preferred, as an outer wall height in that range is adapted to a wide variety of uses. Outer wall 15 may suitably taper outward between about 10 and about 30°. The shorter walls, 19 and 21, may also be varied in height and width dependent upon the use of the receptacle. Suitably the height of the shorter walls is between about ¾ inches and 3 inches, with a particularly useful height of about 1 inch to about 2 inches. Outer wall 15 suitably is tapered downward along portions 23 and 25 at an angle between about 60° and about 80° to join wall 19 to aid in directing trimmings, or other objects, into the receptacle.

Walls 19 and 21 may be molded into base 13. Walls 19 and 21 suitably have a width between about ⅛ and about 1½ inches, and more preferably between about ⅛ and about 1 inch. Preferably they have a rounded top portion. It has been found that if walls 19 and 21 are sized as described, the device will hold a surprisingly large number of trimmings or leaves within its confines. It is postulated that the initial objects, such as trimmings or leaves, placed in the receptacle are caught, or stopped by wall 19 or by wall 21 and that additional objects placed in the receptacle are caught on the previous objects thereby enabling the receptacle to receive and hold a large load, only slightly tapered away from the opening in wall 15. The device aptly includes a plurality of handles, such as 27, positioned around the outer periphery of wall 15. Handles 27 may be molded into, or onto, the device, or may be seperately added, for example, as ropes or straps attached to wall 15.

Receptacle 11 may be equipped with a pulling means, such as rope 41, suitably of nylon, and handle, 43 suitably of wood or plastic.

Figure 2:
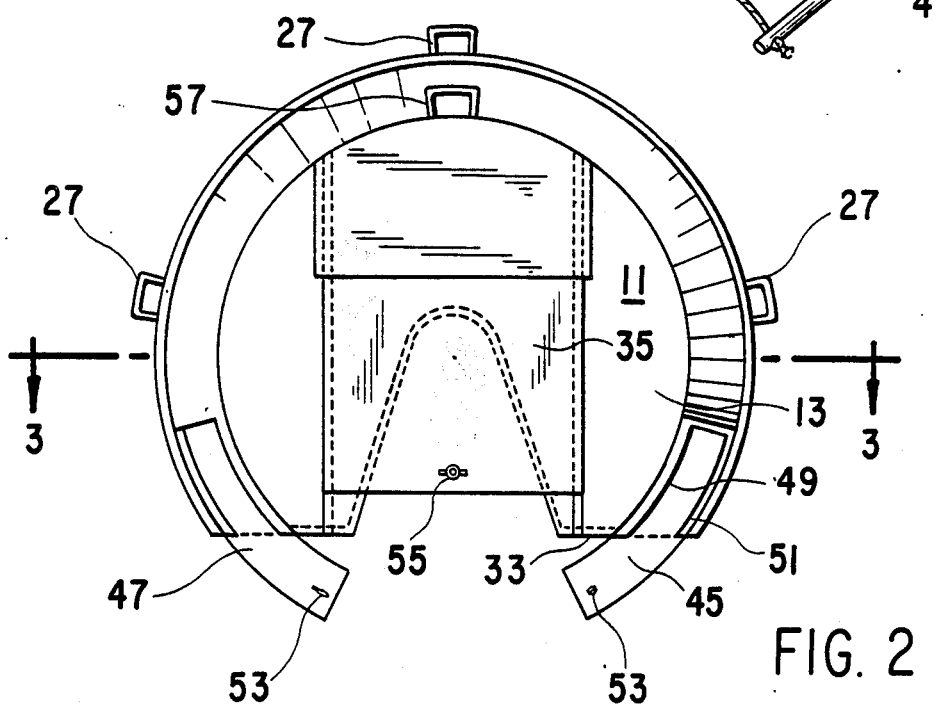
FIG. 2 is a bottom plan view of a particularly preferred embodiment of the receptacle.

FIG. 2 is a bottom plan view showing a particularly preferred embodiment of the receptacle. In such embodiment, receptacle 11 is truncated and wedge-shaped portion 29 is removed providing opening 31 in base 13. Opening 31 is bordered by inner wall 21. Opening 31 is of a size to receive the trunk portion of the tree or shrub to be trimmed enabling the receptacle to be closely positioned around the base of the tree or shrub being trimmed. Opening 31 may suitable be equipped with an opening and closing means, such as sliding door 35 which is slidiably attached to the bottom portion of base 13 by retaining means such as tracks 37, or as a solid housing, such as 38, positioned on base 13 to slidiably receive door 35. Sliding door 35 is preferably fabricated of a material similar to that used to fabricate receptacle 13. In an open position door 35 allows the device to be centered around the tree or shrub being trimmed. In a closed position door 35 extends the available floor area of base 13 allowing the receptacle to hold a larger amount of material. As an example of the utility of door 35, door 35 may be placed in a closed position and receptacle 11 filled with leaves or trimmings, the filled device may then be lifted over a receiving container, a trash can or barrel, preferably plastic, door 35 opened and the contents of receptacle 11 pushed downward and packed into the receiving container. If the receiving container is initially lined with a plastic bag, the result is a packed plastic bag of leaves or trimmings. The bag is easily removeable from the plastic receiving container and ready for disposal.

As shown in FIG. 2, receptacle 11 is truncated along portion 33. The truncated portion extends between ⅛ and ⅓ of the periphery of base 13. Such embodiment facilitates easy handling and transporting of the device. A side wall closure consisting of at least one sliding door, such as, 45 and 47, is positioned contiguous to the outside of wall 19. The purpose of the door, or closure, is to extend wall 15 across opening 17 along truncated portion 33. Doors 45 and 47 are held in a slidiable position along wall 15 by a guide means. The guide means may be tracks, such as, 49 and 51, or a solid housing positioned along the outside portion of wall 15 to receive doors 45 and 47. In such arrangement sliding doors 45 and 47 have a retaining means to hold them in a closed position. The retaining means may be in the form of a latch, such as, 53 to hold doors 45 and 47 detachably secured to each other, or may be in the form of a latch, such as, 55 on sliding door 35 positioned to hold doors 45 and 47 in a closed position when door 35 is also in a closed position.

As shown in FIG. 2, the bottom portion of receptacle 11 has a loop or ring 57 positioned thereon to facilitate storing the device by hanging on a wall.

Figure 3:
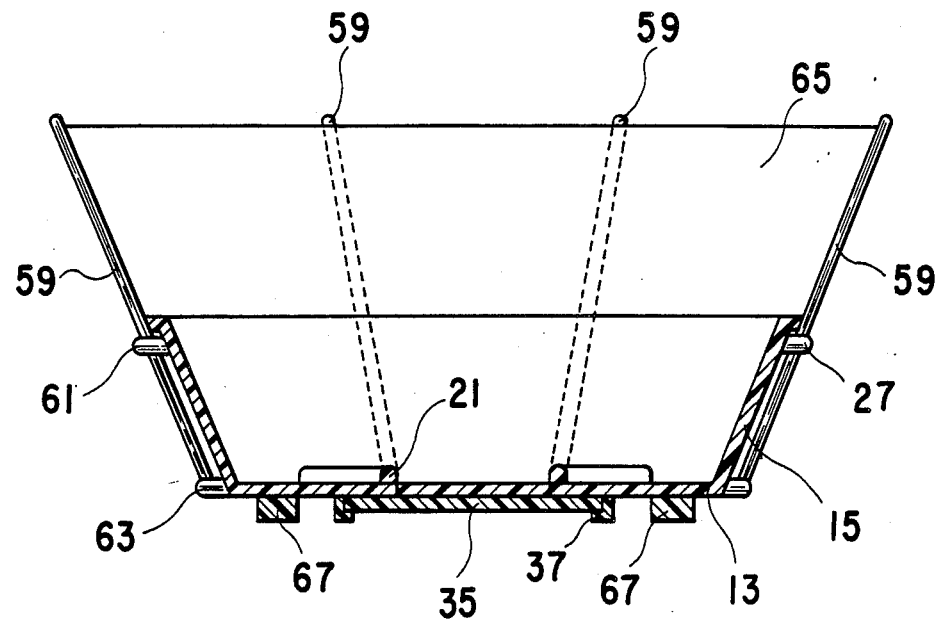
FIG. 3 is a sectional side, partly in crosssection, view taken along plane 3 - 3a of the device shown in FIG. 2.

FIG. 3 illustrates a further embodiment in which outer wall 15 is equipped with a holding means to receive and hold a plurality of pole or rod members, such as, 59. Such holding means may be in the form of retaining brackets, such as, ring 61 and platform, or stop, 63, or may be openings in the top portion of side wall 15. Handles 27 may be utilized as the ring portion of the holding means. The purpose of rod members 59 is to support an upward extention of wall 15, suitably by means of fabric or plastic wall extention 65 extending upward from wall 15 substantially enlarging the capacity of receptacle 11. This embodiment is particularly useful when the device is utilized to receive and collect large amounts of objects, such as, leaves or grass clippings.

FIG. 3 also illustrates runners, such as, 67, which may suitably be positioned along on the bottom portion of receptacle 11 to aid in moving the receptacle along the ground.

Suitably the device is fabricated of a light, rigid or semi-rigid plastic material. Styrene may be used. In such case the walls and base of the device are typically about one inch in thickness. More preferably the device is fabricated of a semi-rigid plastic, such as polyethylene or polypropylene, suitably reinforced. In such case the wall thickness ranges between about 1/16 and about 3/16, and typically about ⅛, inch in thickness. Although the width, or diameter, of the device may be varied in accord with the intended use, widths of over about 10 feet are usually found to be too bulky and clumsy for easy movement and use; widths of less than about 2½ feet are usually too small to be adapted to wide utility. A particularly preferred width range is between about 2½ and about 6 feet.

The top portion of base 13 may have concentric rings, such as, 39, shown in FIG. 1, either marked by printing or painting, or in the form of ridges or grooves. Rings 39 are useful as a guide to the trimmer once the device has been positioned beneath the tree or shrub to be trimmed. The user may place his ownindicating rings or marks on the base for a particular shrub or desired shape.

It will be understood that the present invention is not to be interpreted as limited to the illustrations given above and that the invention may be modified after the present disclosure without departing from the spirit and scope of the invention. It is to be expressly understood that the present invention is limited only by the appended claims.

What is claimed is:

1. A portable receptacle useful for receiving and holding trimmings from trees and shrubs therein comprising:
    a. a rigid base,
    b. a rigid outer wall partially extending around the periphery of said base, said wall ranging from about 6 to about 15 inches in height, said wall having an opening therein ranging in size from about ⅛ and ⅓ of the periphery of said base,
    c. a second wall extending along the periphery of said base along said opening in said outer wall, said second wall ranging from about ¾ to about 3 inches in height,
    d. a third wall extending from one juncture of said first and second walls inward toward the center portion of said base and then outward to the second juncture of said first and second walls, said third wall ranging from about ¾ to about 3 inches in height,
    e. said second and third walls defining a substantially wedge-shaped portion in said base,
    f. said substantially wedge-shaped area being removeable to obtain a walled substantially wedge-shaped opening in said base.

2. The receptacle of claim 1 wherein said base is round and said first wall is annular.

3. The receptacle of claim 1 wherein said first wall tapers outward.

4. The receptacle of claim 1 wherein said first wall has a plurality of handles positioned along the outside thereof.

5. The receptacle of claim 1 wherein said first wall has a holding means thereon to receive and hold an upward extention of said wall.

6. A portable receptacle useful for receiving and holding therein trimmings and leaves from trees and shrubs comprising:
    a. a rigid base,
    b. said base having an opening therein extending inward from the periphery of said base, said opening being of a size to receive the trunk of a tree or shrub, and
    c. a rigid outer wall partially extending around the periphery of said base, said wall ranging from about 6 to about 15 inches in height, said outer wall having an opening therein corresponding to the said opening in said base.

7. The receptacle of claim 6 wherein said base is round and said first wall is annular.

8. The receptacle of claim 6 wherein said opening is substantially wedge-shaped.

9. The receptacle of claim 8 wherein a door is slidably attached to the bottom portion of said base and is positioned to open and close said opening.

10. The receptacle of claim 6 wherein the said first wall tapers outward at an angle between about 60 and about 80° from said base.

11. The receptacle of claim 7 wherein said base is truncated.

12. The receptacle of claim 7 wherein the said base is truncated and said first wall has a closure means thereon to close said truncated portion.

13. The receptacle of claim 6 wherein a plurality of handles are positioned along the outside of said first wall.

14. The receptacle of claim 6 wherein said first wall has a plurality of holding means thereon to receive and hold an upward extention of said wall.

* * * * *